United States Patent [19]
Sweger, Jr.

[11] Patent Number: 5,213,366
[45] Date of Patent: May 25, 1993

[54] SAFETY BELT SHIELD CONSTRUCTION

[76] Inventor: Ronald R. Sweger, Jr., 604 Wertzville Rd., Enola, Pa. 17025

[21] Appl. No.: 900,654

[22] Filed: Jun. 19, 1992

[51] Int. Cl.$^5$ .................. B60R 22/14; A41D 1/04
[52] U.S. Cl. .................... 280/808; 116/212; 116/DIG. 34; 297/465; 297/484; 2/102
[58] Field of Search ............. 280/801, 808; 297/468, 297/482, 483, 484, 464, 465; 116/212, 203, 208, DIG. 34; 2/2, 92, 102

[56] References Cited

U.S. PATENT DOCUMENTS

| 543,086 | 7/1895 | Donovan | 2/2 |
|---|---|---|---|
| 2,249,966 | 7/1941 | Matthews | 2/2 |
| 3,866,909 | 2/1975 | DeSantis | 2/2 |
| 3,941,404 | 3/1976 | Otaegui-Ugarte | 2/92 |
| 4,063,778 | 12/1977 | Chika | 297/465 |
| 4,457,251 | 7/1984 | Weman | 297/468 |
| 4,610,463 | 9/1986 | Efrom | 297/464 |
| 4,958,853 | 9/1990 | Doty | 116/203 |
| 5,088,867 | 2/1992 | Mun | 116/212 |

FOREIGN PATENT DOCUMENTS

| 2530337 | 1/1977 | Fed. Rep. of Germany | 297/468 |
|---|---|---|---|
| 2617506 | 11/1977 | Fed. Rep. of Germany | 280/808 |
| 2727443 | 12/1978 | Fed. Rep. of Germany | 297/465 |
| WO91/02338 | 2/1991 | PCT Int'l Appl. | 116/208 |

Primary Examiner—Karin L. Tyson
Attorney, Agent, or Firm—Leon Gilden

[57] ABSTRACT

A shield arrangement is arranged for receiving a seat belt, typically within a self-propelled vehicle. The shield structure is formed of shape retentent material having loop members to convex outer surface thereof to receive the safety belts to effect distribution of force during impact about a larger surface area of an individual's body. A modification of the invention includes reinforcing members, as well as indicator fluid, to indicate fatigue of the shield structure.

1 Claim, 4 Drawing Sheets

SAFETY BELT SHIELD CONSTRUCTION

BACKGROUND OF THE INVENTION

1. Field of the Invention

The field of invention relates to safety belt apparatus, and more particularly pertains to a new and improved safety belt shield construction wherein the same is arranged to distribute impact force over a greater area than a seat belt affords to minimize injury to an individual.

2. Description of the Prior Art

Safety belts typically are utilized today in an effective manner to minimize injury to individuals during vehicular accident and impact. Safety belts have been found to impart injury to individuals, particularly to children and individuals of greater physical frailty. The instant invention attempts to overcome deficiencies of the prior art by providing for shield structure mounting the safety belt organization of a vehicle therethrough to afford distribution of impact over greater surface area. Prior art cushioning and the like for safety belts is indicated in U.S. Pat. No. 4,786,080.

A cushion structure arranged for mounting to a safety belt is set forth in U.S. Pat. No. 4,348,037 to Law, et al. having an inflatable member mounted to a seat belt structure.

As such, it may be appreciated that there continues to be a need for a new and improved safety belt shield construction as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of safety belt apparatus now present in the prior art, the present invention provides a safety belt shield construction wherein the same is arranged to provide a shield formed of memory retentent material to maintain a predetermined shaped configuration providing upper torso support and impact force distribution to an individual in use. As such, the general purpose of the present invention, which will be described subsequently in greater detail, is to provide a new and improved safety belt shield construction which has all the advantages of the prior art safety belt apparatus and none of the disadvantages.

To attain this, the present invention provides a shield arrangement for receiving a seat belt, typically within a self-propelled vehicle. The shield structure is formed of shape retentent material having loop members to convex outer surface thereof to receive the safety belts to effect distribution of force during impact about a larger surface area of an individual's body. A modification of the invention includes reinforcing members, as well as indicator fluid, to indicate fatigue of the shield structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved safety belt shield construction which has all the advantages of the prior art safety belt apparatus and none of the disadvantages.

It is another object of the present invention to provide a new and improved safety belt shield construction which may be easily and efficiently manufactured and marketed.

It is a further object of the present invention to provide a new and improved safety belt shield construction which is of a durable and reliable construction.

An even further object of the present invention is to provide a new and improved safety belt shield construction which is susceptible of a low cost of manufacture with regard to both materials and labor, and which accordingly is then susceptible of low prices of sale to the consuming public, thereby making such safety belt shield constructions economically available to the buying public.

Still yet another object of the present invention is to provide a new and improved safety belt shield construction which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
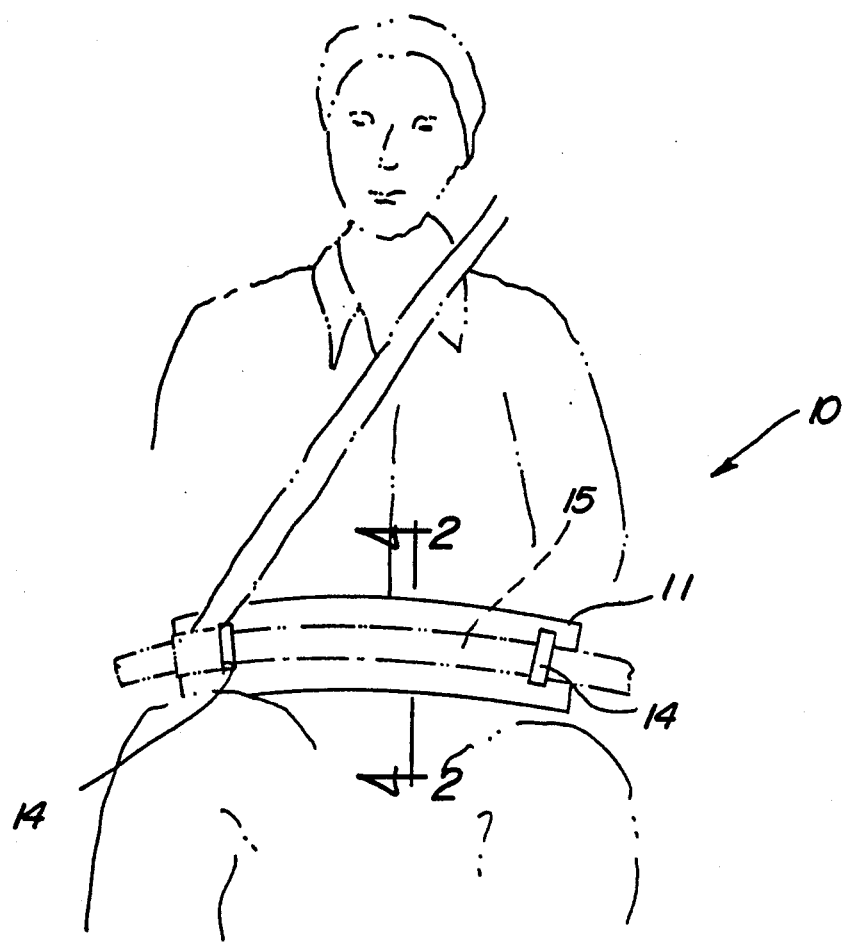
FIG. 1 is an orthographic view of the safety belt construction of the invention.
Figure 2:
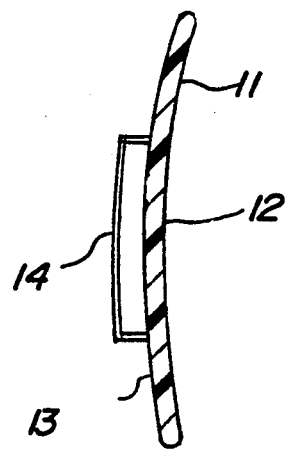
FIG. 2 is an orthographic view, taken along the lines 2—2 of FIG. 1 in the direction indicated by the arrows.

With reference now to the drawings, and in particular to FIGS. 1 to 9 thereof, a new and improved safety belt shield construction embodying the principles and concepts of the present invention and generally designated by the reference numeral 10 will be described.

Figure 3:
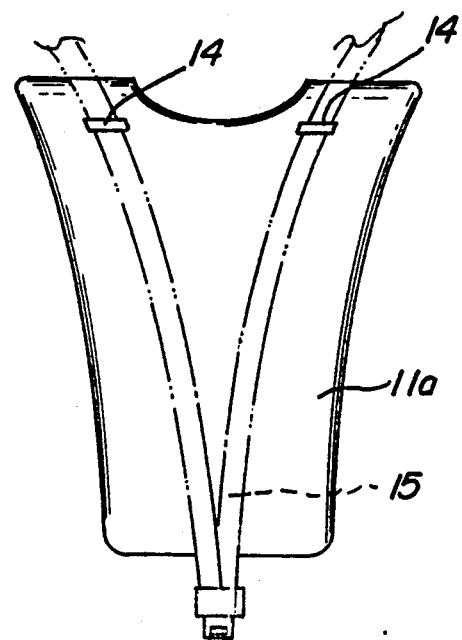
FIG. 3 is an orthographic view of a further example of the safety belt shield construction of the invention.

More specifically, the safety belt shield construction 10 of the instant invention essentially comprises a flexible shield plate 11 formed of a shape retentive material arranged to maintain original configuration upon flexure thereof. The shield plate 11 is formed with a concave rear wall 12 and a convex forward wall 13. The forward wall 13 includes a plurality of safety belt receiving loops 14 to receive and secure a safety belt 15 in position in orientation relative to the plate 11. The FIG. 3 illustrates a breast plate shield structure 11a having a top edge, with a top edge recess arranged to position an individual's neck therewithin of construction as indicated with reference to the shield plate 11 of FIG. 1.

Figure 4:
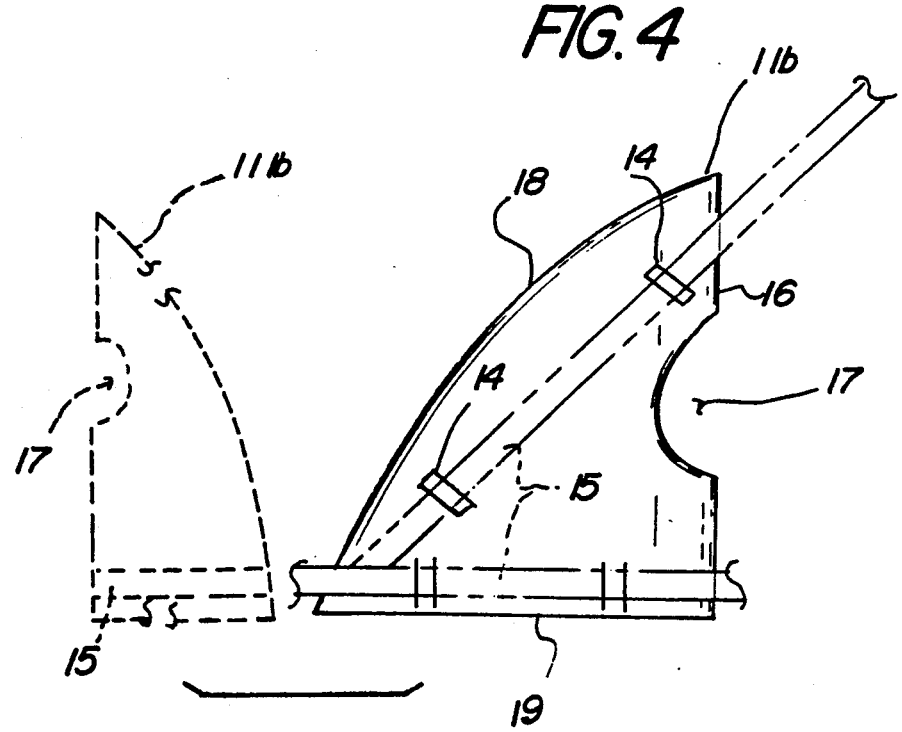
FIG. 4 is an orthographic view of a yet further safety belt shield construction of the invention.
Figure 5:
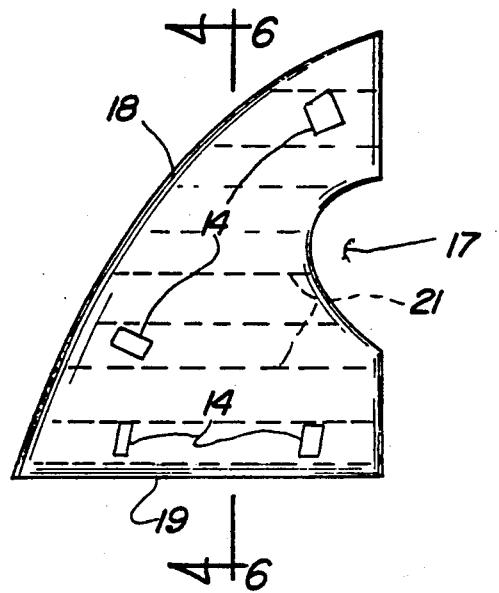
FIG. 5 is an orthographic view of the shield construction.

FIG. 4 indicates a first shield plate 11b and a second shield plate 111b, each of a mirror image construction relative to one another, wherein the first shield plate 11b will be described, but it is understood that the second shield plate is of a mirror image construction for use. As indicated, the second shield plate is arranged for utilization by an individual seated in a passenger compartment of an associated transport vehicle, whereas the first shield plate 11b is arranged for utilization by a driver of such vehicle. The first shield plate 11b is formed with a shield rear edge 16 having a rear edge recess 17 to position an individual's arm therealong, with a shoulder belt 15 directed through a first plurality of safety belt receiving loops 14 and a seat belt 15 portion of the safety belt structure having a second plurality of seat belt loops adjacent the linear bottom edge 19 of the first shield plate 11b. An arcuate forward edge 18 orients the first safety belt loops in adjacency thereto.

Figure 7:
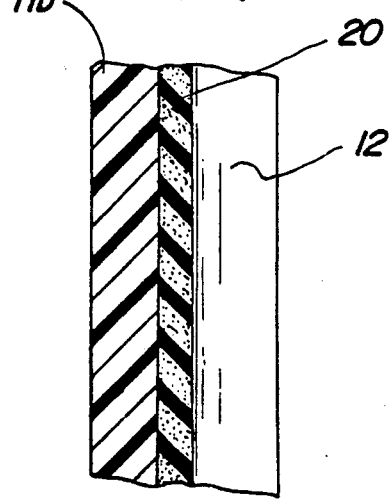
FIG. 7 is an orthographic view of section 7 as set forth in FIG. 6.
Figure 6:
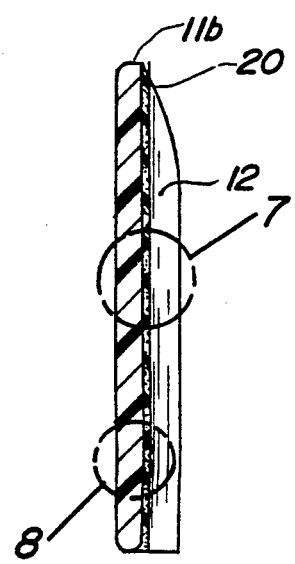
FIG. 6 is an orthographic view, taken along the lines 6—6 of FIG. 5 in the direction indicated by the arrows.
Figure 8:
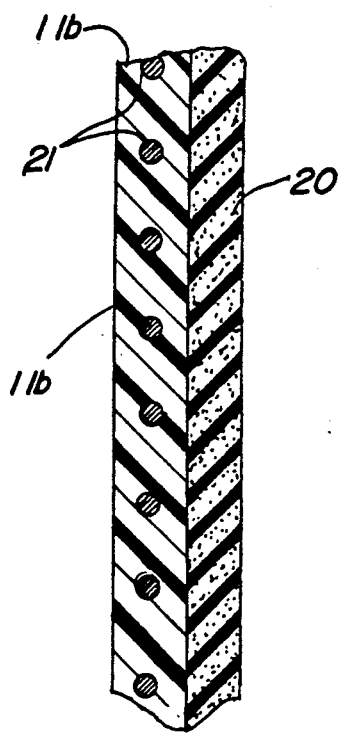
FIG. 8 is an orthographic view of section 8 as set forth in FIG. 6.

FIG. 7 indicates the shield plate 11b having a polymeric foam liner 20 coextensive with the concave rear wall 12. Further, should reinforcement be required, the FIG. 8 illustrates that the shield 11b is arranged with a plurality of parallel metallic rods 21, each having spring-backed characteristics (of shape retentive material) to maintain shape of the first shield plate 11b. The rods are indicated as arranged parallel and coextensively directed orthogonally relative to the shield rear edge 16.

Figure 9:
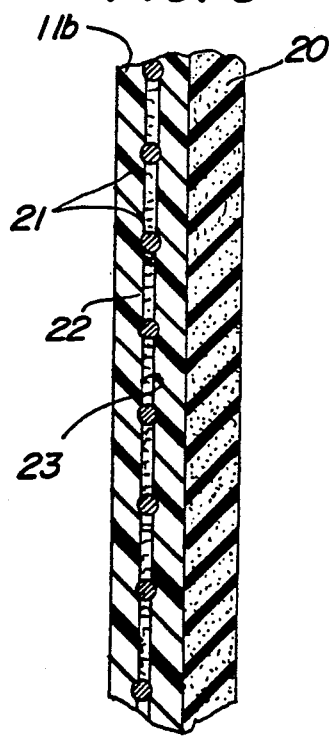
FIG. 9 is an orthographic cross-sectional illustration of a modified shield member having indicator fluid contained therewithin.

FIG. 9 illustrates the use of at least one fluid dye channel 23 directed coextensively between and in orthogonal relationship to the rods 21. The channel 23 is filled with a fluid dye 22. Upon repeated flexure of the first shield plate 11b and cracking due to age and fatigue, the fluid dye 22 will seep through fissures and cracks within the structure for visual observation by individuals to indicate replacement of the shield as necessary.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A safety belt shield construction, comprising,
    a flexible shield plate formed of a shape retentive material having a concave rear wall and a convex forward wall, with the rear wall coextensive with the forward wall, and
    a linear bottom edge, with a plurality of safety belt receiving loops mounted on the convex forward wall adjacent the lower edge, with the loops oriented orthogonally relative to the lower edge to receive a safety belt therethrough, and
    the shield plate includes a rear edge, the rear edge having an arm accommodating recess directed in the rear edge in a spaced relationship from the lower edge, and an arcuate forward edge extending from an upper distal end of the rear edge to the lower edge, and a further plurality of safety belt receiving loops mounted to the convex forward wall to receive a shoulder harness belt therethrough, and
    the concave rear wall includes a polymeric foam liner coextensive with the concave rear wall, and
    a plurality of parallel rods oriented parallel to the lower edge and orthogonally to the rear edge, with the parallel rods formed of a shape retentive material, and
    including at least one fluid channel orthogonally directed between the rods, with the channel having a fluid dye contained therewithin, whereupon damage to the shield plate effects transmission of the fluid dye therethrough for visual observation of the shield plate.

* * * * *